July 22, 1969  L. E. McBRIDE, JR., ET AL  3,456,878
THERMOSTATIC APPARATUS
Filed July 14, 1967  3 Sheets-Sheet 1

Lyle E. McBride, Jr. and
Joseph W. Waseleski, Jr.,
Inventors.
Koenig, Senniger, Powers and Leavitt,
Attorneys.

United States Patent Office 3,456,878
Patented July 22, 1969

3,456,878
THERMOSTATIC APPARATUS
Lyle E. McBride, Jr., Norton, and Joseph W. Waseleski, Mansfield, Mass., assignors to Texas Instruments Incorporated, Dallas, Tex., a corporation of Delaware
Filed July 14, 1967, Ser. No. 653,469
Int. Cl. G05d 23/00, 23/19
U.S. Cl. 236—1                                    17 Claims

ABSTRACT OF THE DISCLOSURE

Thermostatic apparatus is disclosed in which the temperature in a given zone is sensed and controlled by means of a thermistor whose electrical resistance changes relatively rapidly or abruptly over a relatively narrow range of temperatures. Control means are provided for varying heat flow into the zone to keep the thermistor temperature within this narrow range. To permit the thermistor to respond to zone temperatures outside of the narrow range, the thermistor is variably thermally coupled to a member which is maintained at a fixed predetermined temperature. By varying the thermal coupling between the thermistor and the member relative to the thermal coupling between the thermistor and its environment within the zone, the temperature differential between the zone temperature and the sensor temperature may also be varied. Accordingly, the particular zone temperature which must be maintained to keep the thermistor temperature in the aforesaid narrow range can also be conveniently varied. Means are also disclosed for varying the temperature at which the zone is maintained as a function of the humidity in the zone.

---

This invention relates to thermostatic apparatus and more particularly to such apparatus which is operative to maintain the temperature in a given zone at a preselectable level.

It has been known heretofore to employ a thermistor for sensing or controlling the temperature within a given zone. In order to permit operation over an appreciable range of temperatures, the thermistors typically employed are those having a relatively linear or gentle slope of their resistance-temperature characteristics so that a signal which varies according to a substantially linear function of temperature may be obtained. Temperature control at different levels may then be provided by electronically varying a preselectable reference threshold against which the signal is compared for controlling heating or cooling apparatus. In such prior art systems, however, the electronic sensing system which responds to the resistance of the thermistor must be quite sensitive if close temperature control is to be obtained, since small changes in temperature produce only small changes in thermistor resistance and corresponding small changes in signal level.

Various thermistor materials are known in which the resistance of the material changes relatively rapidly or abruptly with temperature over a limited or narrow range of temperatures. Such materials may have either a positive or negative temperature coefficient. Such materials provide very great sensitivity or gain within the narrow range of the abrupt change since a small change in temperature can produce a relatively large change in resistance and signal level. These materials, however, have not typically been employed in temperature sensing and control systems because of the limited range of temperatures over which such substantial resistance changes are obtainable.

Among the several objects of the present invention may be noted the provision of thermostatic apparatus which will respond to an appreciable range of temperature in a given zone; the provision of such apparatus which is highly sensitive; the provision of such apparatus which employs thermistor materials whose electrical resistance changes rapidly with temperature over a limited range of temperatures; the provision of such apparatus which will maintain the temperature in a given zone precisely at a preselectable level, the provision of such apparatus which will maintain the temperature in a given zone at a temperature level which varies as a function of relative humidity thereby to maintain a preselected comfort level; the provision of such apparatus which is highly reliable and which is relatively simple and inexpensive. Other objects and features will be in part apparent and in part pointed out hereinafter.

Briefly, thermostatic apparatus according to this invention is responsive to the temperature within a given zone. The apparatus includes a member which is provided with means for maintaining the member itself at a fixed predetermined temperature. The apparatus also includes a temperature sensor which is thermally coupled both to the environment in the zone and to the fixed temperature member. Means are provided for selectively varying the value of the thermal coupling between the sensor and the fixed temperature member relative to the value of the thermal coupling between the sensor and the environment thereby to vary the temperature differential between the environment of the zone and the sensor.

In one aspect of the invention, the apparatus includes also means for varying heat flow relative to the zone thereby to keep the temperature of the sensor substantially at a predetermined level, the temperature at which the zone is maintained in keeping the sensor at that level being variable by varying the value of the thermal coupling between the sensor and the fixed temperature member relative to the thermal coupling between the sensor and the zone environment.

In another aspect of the invention, the sensor is coupled to a second member which second member is provided with means for maintaining itself at a temperature which varies as a function of the humidity in the zone. Thus the zone is controlled to a temperature which varies as a function of the humidity in the zone thereby to maintain the zone at a preselected comfort level.

The invention accordingly comprises the constructions hereinafter described, the scope of the invention being indicated in the following claims.

In the accompanying drawings, in which several of various possible embodiments of the invention are illustrated;

Corresponding reference characters indicate corresponding parts throughout the several views of the drawings.

Figure 1:
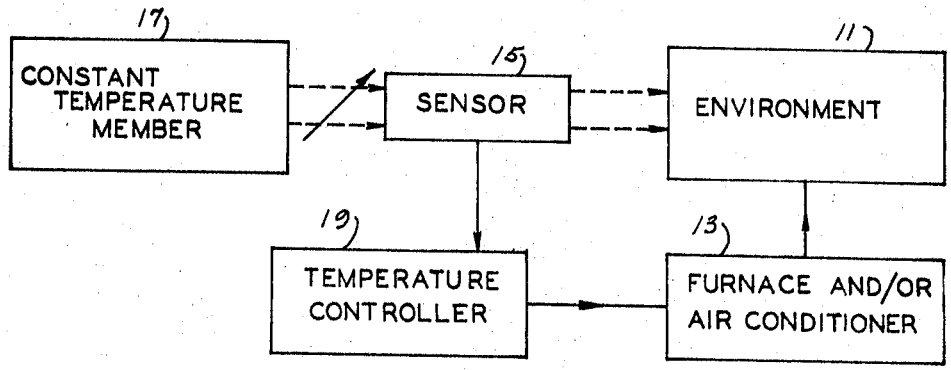
FIG. 1 is a block diagram of a thermostatic temperature control system according to this invention.

Referring now to FIG. 1, a zone or environment in which the environmental temperature is to be controlled is indicated generally at 11. Environment 11 may, for example, comprise the interior of a residential structure. At 13 is indicated means, e.g., a furnace and/or an air conditioner, for providing heat flow relative to the zone 11. A temperature sensor 15 is thermally coupled to the environment of the controlled zone as indicated by the broken-line arrows between the sensor 15 and environment 11. Temperature sensor 15 preferably comprises a thermistor but other sensors may also be used.

Sensor 15 is also thermally coupled to a member 17. The thermal coupling between sensor 15 and member 17 is again indicated by broken-line arrows linking these elements and the value of this thermal coupling is variable as indicated by the diagonal arrow crossing the broken-line arrows. Member 17 is provided with means for maintaining the member itself substantially at a fixed predetermined temperature.

As the sensor 15 is thermally coupled both to the zone environment 11 and to the constant temperature member 17, the temperature of the sensor depends upon the relative values of the two thermal couplings as well as upon the temperature of the environment 11 and of the member 17. In the absence of self-heating of the sensor itself, the sensor will assume a temperature which is intermediate the temperature of the body 17 and the environmental temperature in zone 11. This intermediate temperature is in effect determined by dividing the temperature difference between body 17 and zone 11 according to an inverse function of the ratio of the values of the respective thermal couplings. In other words, the two thermal couplings establish a sort of potentiometric relationship between sensor temperature and the two temperature sources to which the sensor is thermally coupled. It can be seen that, by varying the value of one or the other of the thermal couplings, the temperature of the sensor can be varied. For example, by varying the closeness of the thermal coupling between the constant temperature member 17 and the sensor 15, the temperature differential between the sensor 15 and the environment in zone 11 can be varied.

Sensor 15 is interconnected with a temperature controller 19 which responds to the temperature sensed by the sensor to control the energization of the heat flow varying means 13. The heat flow relative to the zone is thereby automatically adjusted to keep the temperature of the sensor 15 at a fixed, predetermined level. In keeping the sensor 15 at the aforesaid fixed, predetermined level, the controller 19 will also inherently maintain the temperature of the zone 11 at a corresponding level depends upon or is defined by the previously described temperature differential between the sensor 15 and zone 11. Since, as explained above, this temperature differential can be changed by varying the value of the thermal coupling between the sensor 15 and the constant temperature member 17 with respect to the value of the thermal coupling between the sensor 15 and the zone environment 11, the temperature at which the environment 11 is maintained in keeping the sensor at the predetermined temperature can also be varied. Thus the apparatus of FIG. 1 is operative to maintain the temperature in the zone environment 11 at a level which is preselectable from an appreciable range of temperatures even though the sensor 15 is kept at a temperature which is essentially fixed and unchangeable.

Figure 2:
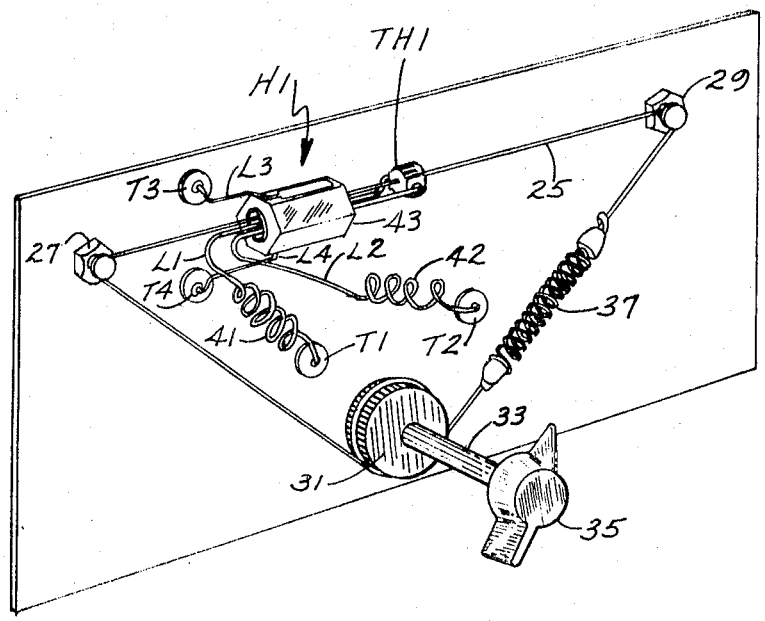
FIG. 2 is a front view of a solid-state thermostat employed in the system of FIG. 1.

A solid-state thermostat construction which provides variable thermal coupling between a temperature sensor and a constant temperature member is illustrated in greater detail in FIG. 2. In the construction illustrated in FIG. 2, a temperature sensing thermistor TH1 is movably supported in relation to a stationary heater H1. Heater H1 is constructed in generally tubular form and connections to thermistor TH1 are made by means of a pair of leads L1 and L2 which extend from thermistor TH1 through the tubular heater H1 to a pair of terminals T1 and T2. Leads L1 and L2 are coiled as indicated at 41 and 42 to permit thermistor TH1 to be moved back and forth relative to heater H1 without straining the leads.

Thermistor TH1 is mounted on a so-called dial cord 25 which is strung over a pair of idler pulleys 27 and 29 and around a drive pulley 31. Drive pulley 31 is mounted on a shaft 33 which is manually rotatable by means of a knob 35. Dial cord 25 is kept under tension by means of a coil spring 37 in conventional manner.

Heater H1 may, for example, comprise a self-regulating heater generally of the type disclosed in application Ser. No. 435,165, filed Feb. 25, 1965. Such heaters comprise a mass 43 of a steep-slope PTC (positive temperature coefficient of resistivity) semiconductor material having an abrupt transition temperature above which the resistance of the material rises relatively abruptly. If a sufficient voltage is applied across mass 43, as by means of a pair of leads L3 and L4 which are connected to terminals T3 and T4, the mass of material self-heats due to internal resistive consumption of power until the mass reaches the transition temperature. When the transition temperature is reached, the resulting increase in the material's resistance causes a decrease in the power consumed thereby maintaining the temperature of the mass 43 at the transition temperature. The transition temperature is maintained quite precisely in spite of any deviations in the ambient temperature or in the supply voltage. In the example illustrated, a transition temperature of 120° may be taken as illustrative.

Thermistor TH1 may, for example, comprise a pellet of a steep-slope PTC thermistor material which is somewhat similar to that used in heater H1 but which has a lower transition temperature. The material of thermistor TH1 may, for example, have a transition temperature of 80° C. above which the resistance of the thermistor TH1 rises relatively abrupt, a substantial portion of this abrupt change in resistance occurring within a narrow range of temperatures around 80° C.

TH1 also may comprise a pellet of steep-slope NTC thermistor material, the resistance of which decreases relatively abruptly above a transition temperature of, for example, 68° C., a substantial portion of this abrupt change occurring within a narrow range of temperatures around 68°.

By virtue of its exposed surface, thermistor TH1 is thermally coupled to or in heat exchange relationship with the environment surrounding the thermostat, e.g., the environment 11 of FIG. 1 which may be assumed to have a nominal temperature around 25° C. If desired, this thermal coupling can be increased in value, e.g., by adding fins to the thermistor which would aid in obtaining heat exchange with the ambient air. The thermistor TH1 is also thermally coupled to the heater H1. This coupling is principally through the leads L1 and L2 but also through the intervening air space. It can be seen that, by rotating knob 35, thermistor TH1 can be moved closer to or further from heater H1 and that, as the thermistor TH1 is so moved, the value of the thermal coupling between thermistor TH1 and heater H1 is correspondingly varied relative to the substantially fixed value of the thermal coupling between the thermistor TH1 and the environment. Thus the temperature differential between the thermistor and the temperature of the environment is also variable as described previously. If the variable resistance of thermistor TH1 is employed to control heat flow into the environment of the thermostat, as described previously with reference to FIG. 1, so as to keep the material of thermistor TH1 at its transition temperature, the environmental temperature which is thereby maintained will depend upon the position of thermistor TH1 in relation to the heater H1. Thus, by manually varying this spacing using the knob 35, the particular environment temperature which is maintained can be selected from a substantial range of temperatures even though the thermistor TH1 is always operated at the same temperature, i.e., the transition temperature of the thermistor material. By operating thermistor TH1 always at the transition temperature, a very sensitive control of temperature is obtained since small deviations in temperature produce relatively large changes in the resistance which controls heat flow. Accordingly, it can be seen that both inherently high sensitivity and the ability to select or adjust the controlled temperature are provided in the same control. Further, since the heater H1 is self regulating to a fixed temperature and the set point is determined by adjustment of the thermal coupling between thermistor TH1 and heater H1, the set point is not disturbed by variations in supply voltage which would affect a heater which was variably energized to vary the set point.

While variation of physical separation has been illustrated as a means of varying thermal coupling, other means, such as the introduction of a variable thermal barrier may also be used. Further, it should be understood that the value of either thermal coupling may be varied since it is the relative values which determine the temperature of the sensing thermistor.

Figure 3:
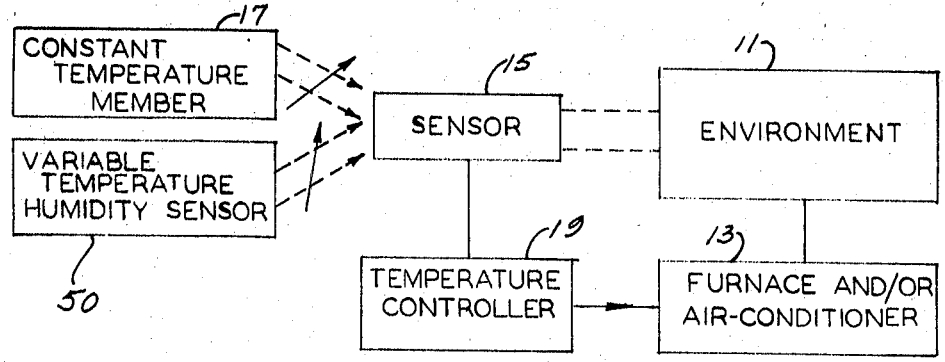
FIG. 3 is a block diagram of a temperature control system according to the invention in which the temperature maintained varies as a function of humidity.
Figure 4:
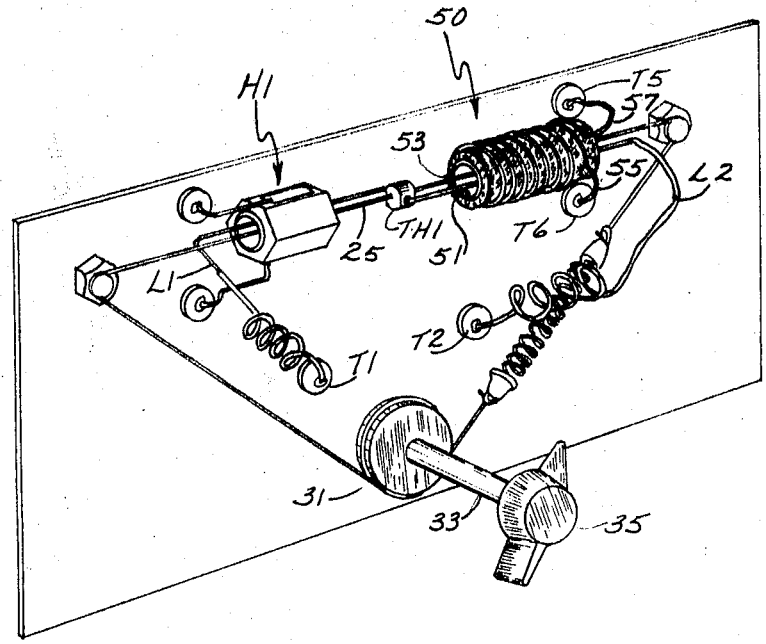
FIG. 4 is a front view of a solid-state, humidity sensitive thermostat employed in the system of FIG. 3.

In FIGS. 3 and 4 there is illustrated a modification of a thermostatic apparatus of FIGS. 1 and 2, which modification automatically varies the temperature at which the control zone is maintained in response to changes in humidity thereby to maintain a preselected comfort level. It is well known that, as relative humidity decreases, it is necessary to increase the air temperature to maintain the same level of human comfort due to the cooling effect of evaporation from exposed skin surfaces. For example, 77° F. is reasonably comfortable if the relative humidity is 11% but to maintain the same comfort level at 40% relative humidity, a temperature of 73° F. is required. The comfort level control illustrated in FIG. 3 employs a variable-temperature humidity sensor 50 which can thermally affect or bias sensor 15 as indicated by the broken-line arrows. This thermal coupling is variable as indicated by the diagonal arrow crossing the broken-line arrows. Humidity sensor 50 may, as illustrated in FIG. 4, comprise a sensor substantially of the type described in greater detail in "The Mode of Operation of Saturation Temperature Hygrometers Based on Electrical Detection of a Salt-Solution Phase Transition," by D. E. Nelson and E. J. Amdur, in Principles and Methods of Measuring Humidity in Gases (R. E. Ruskin, ed.), vol. I, pp. 617–626, Reinhold Pub. Corp. (New York), 1965. As illustrated sensor 50 comprises a tubular mandrel 51 upon which is wrapped a porous medium or matrix 53, e.g., cloth, which is impregnated with lithium chloride salts. A pair of wires 55 and 57 are wrapped around the layer of material 53 in the form of a pair of interlaced helixes. Wires 55 and 57 constitute electrodes which are connected together only through the lithium chloride impregnated medium 53. Wires 55 and 57 are connected to respective terminals T5 and T6. The sensing thermistor TH1 is again supported on dial cord 25 but, in this modification, the leads L1 and L2 extend in opposite directions so that the lead L1 extends through the tubular heater H1 while the lead L2 extends through the variable temperature humidity sensor 50. Thermistor TH1 is thus thermally coupled to both the heater H1 and to the humidity sensor 50, the values of these thermal couplings being conjointly variable in opposite senses by rotation of the knob 35. It will thus be apparent that heating of the sensor 50 will affect the temperature differential between the thermistor TH1 and its environment and thus, if heat flow relative to the environment is controlled to maintain a particular fixed temperature of thermistor TH1, the environmental temperature which corresponds to the predetermined thermistor temperature will be lowered as sensor 50 increases in temperature.

Figure 5:
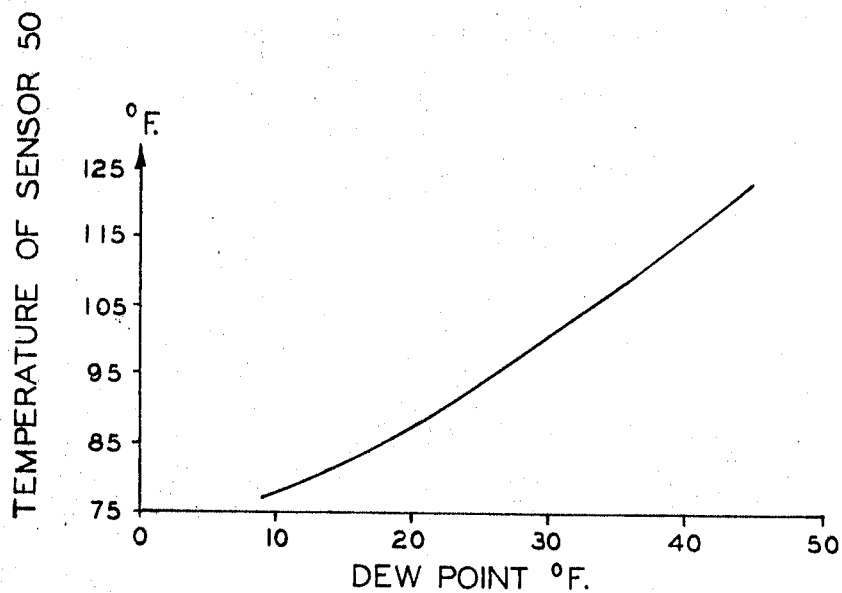
FIG. 5 is a graph representing the response of a humidity sensor employed in the FIG. 4 embodiment.

The resistance present between humidity sensor electrode wires 55 and 57 depends upon the water vapor content of the air in the environment around the sensor 50. When a suitable voltage is applied between terminals T5 and T6, the sensor 50 is electrically heated due to resistive consumption of power in the path between the electrode wires 55 and 57 until the surface of the sensor reaches that temperature which corresponds to about 11% relative humidity. At this point, absorbed water is given off by the lithium chloride increasing the electrical resistance between wires 55 and 57. The increase in resistance causes a decrease in the heat generated to a level just sufficient to maintain the temperature corresponding to 11% relative humidity. Thus, there is a particular sensor temperature corresponding to each absolute water content of an air atmosphere or to each dew point. This correspondence is represented in the graph of FIG. 5. Referring back to the numerical example of comfort level described previously, the sensor 50 assumes the temperature of about 77° F. when the ambient temperature is 77° and the relative humidity is 11% and when the ambient temperature is 73° F. and the relative humidity is 40% the sensor will assume a temperature of about 118° F.

Accordingly, a substantially constant comfort level will be maintained if the thermal coupling between sensor 50 and thermistor TH1 is such that a rise in the temperature of humidity sensor 50 of 41° F. will produce, through the operation of the temperature controller 19, a 4° drop in the temperature of the environment. At higher nominal temperature settings, it may be desirable to increase the change in environmental temperature which offsets a given humidity change to maintain a constant comfort level. In this case, the value of the thermal coupling between the humidity sensor 50 and the sensing thermistor TH1 must be increased as the nominal temperature setting is raised. In the construction illustrated in FIG. 2, this desirable increase in the coupling between sensor 50 and thermistor TH1 is accomplished simultaneously or conjointly with a change which produce increased environmental temperatures since the thermistor TH1 moves closer to the humidity sensor as it moves away from the constant temperature member 17.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense. For instance, it is within the purview of the invention to make heater H1 moveable, and sensor TH1 and humidity sensor 50 stationary. In this case the relative effect of humidity change on environmental temperature would remain constant at all temperature settings; however, the normal range of temperatures over which a thermostat is adjusted is sufficiently narrow that in certain applications the resulting deviation from a constant comfort level may be neglected.

What is claimed is:

1. Thermostatic apparatus responsive to the temperature in a given zone, said apparatus comprising:
 a member provided with means for maintaining said member at a fixed predetermined temperature;
 a temperature sensor including a thermistor having a transition temperature at which the resistance of said thermistor changes relatively abruptly and including means for thermally coupling said thermistor to the environment in said zone and to said member; and
 means for selectively varying the value of the thermal coupling between said sensor and said member relative to the value of the thermal coupling between said sensor and said environment thereby to vary the temperature differential between said zone and said sensor.

2. Thermostatic apparatus as set forth in claim 1 wherein said thermistor comprises a semiconductor material and the resistance of said material rises relatively abruptly above said transition temperature.

3. Thermostatic apparatus as set forth in claim 1 wherein said member comprises a heater.

4. Thermostatic apparatus as set forth in claim 3 wherein said heater comprises a mass of a semiconductor material having a transition temperature above which the resistance of said material rises abruptly and comprises also means for applying a voltage across said mass.

5. Thermostatic apparatus as set forth in claim 1 including means for varying heat flow relative to said zone as a function of the temperature of said sensor.

6. Thermostatic apparatus as set forth in claim 1 wherein said means for varying thermal coupling comprises means for varying physical separation between said thermistor and said member.

7. Thermostatic apparatus for maintaining the temperature in a given zone at a preselectable level, said apparatus comprising:
- a member provided with means for maintaining said member at a fixed predetermined temperature;
- a temperature sensor including a thermistor the resistance of which changes relatively abruptly substantially at a predetermined transition temperature and including also means for thermally coupling said thermistor to the environment in said zone and to said member;
- means for varying heat flow relative to said zone as a function of the resistance of said thermistor thereby to keep the temperature of said thermistor substantially at said transition temperature; and
- means for selectively varying the value of the thermal coupling between said thermistor and said member relative to the value of the thermal coupling between said thermistor and said environment thereby to vary the temperature at which said zone is maintained in keeping said thermistor substantially at said transition temperature.

8. Thermostatic apparatus as set forth in claim 7 wherein said heater comprises a mass of a semiconductor material having a transition temperature above which the resistance of said material rises relatively abruptly and comprises also means for applying a voltage across said mass.

9. Apparatus for maintaining a given zone substantially at a preselected comfort level, said apparatus comprising:
- a member provided with means for maintaining said member at a temperature which varies as a function of the humidity in said zone;
- a temperature sensor provided with means for thermally coupling said sensor to the environment in said zone and to said member;
- means controlled by said sensor for varying heat flow relative to said zone thereby to keep the temperature of said sensor substantially at a predetermined level whereby said zone is controlled to a temperature which varies as a function of the humidity in said zone thereby to maintain said zone at said preselected comfort level.

10. Thermostatic apparatus as set forth in claim 9 wherein said member includes a pair of electrodes, means for applying a voltage across said electrodes, and means including lithium chloride salts providing a resistive path between said electrode, said salts being exposed to the environment in said zone whereby the temperature of said member varies as a function of the humidity in said zone.

11. Thermostatic apparatus as set forth in claim 10 wherein said salts are supported on a porous matrix between said electrodes.

12. Thermostatic apparatus as set forth in claim 9 wherein said temperature sensor comprises a thermistor and wherein said apparatus includes means for varying the thermal coupling between said thermistor and said member.

13. Apparatus for maintaining a given zone substantially at a preselected comfort level, said apparatus comprising:
- a first heater provided with means for maintaining itself at a temperature which varies as a function of the humidity in said zone;
- a second heater provided with means for maintaining itself at a fixed predetermined temperature;
- a temperature sensor including a thermistor the resistance of which changes relatively abruptly substantially at a predetermined transition temperature and including also means for thermally coupling said thermistor to the environment in said zone and to said first and second heaters;
- means for varying heat flow relative to said zone as a function of the resistance of said thermistor thereby to keep the temperature of said thermistor substantially at said transition temperature; and
- means for concomitantly varying the values of the thermal coupling between said thermistor and said first heater and the thermal coupling between said thermistor and said second heater relative to the value of the thermal coupling between said thermistor and said environment thereby to vary the comfort level at which said zone is maintained in keeping said thermistor substantially at said transition temperature.

14. Thermostatic apparatus as set forth in claim 13 wherein said sensor includes a thermistor and said means for varying said thermal coupling values comprises means for moving said thermistor between said first and second members thereby to increase the value of the thermal coupling between said thermistor and said first member as the value of the thermal coupling between said thermistor and said second member is decreased.

15. Thermostatic apparatus as set forth in claim 1 wherein said thermistor comprises a semiconductor material and the resistance of said material falls relatively abruptly above said transition temperature.

16. Apparatus for maintaining a given zone substantially at a preselected comfort level, said apparatus comprising:
- a first heater provided with means for maintaining itself at a temperature which varies as a function of the humidity in said zone;
- a second heater provided with means for maintaining itself at a fixed predetermined temperature;
- a temperature sensor including a thermistor the resistance of which changes relatively abruptly substantially at a predetermined transition temperature and including also means for thermally coupling said thermistor to the environment in said zone and to said first and second heaters;
- means for varying heat flow relative to said zone as a function of the resistance of said thermistor thereby to keep the temperature of said thermistor substantially at said transition temperature; and
- means for varying the value of thermal coupling between said thermistor and said second heater relative to the value of the thermal coupling between said thermistor and said environment thereby to vary the comfort level at which said zone is maintained in keeping said thermistor substantially at said transition temperature.

17. Thermostatic apparatus as set forth in claim 16 wherein said sensor includes a thermistor and said means for varying said thermal coupling values comprises means for moving said second member thereby to alter the value of the thermal coupling between said thermistor and said second member without altering the value of the thermal coupling between said thermistor and said first member.

References Cited

UNITED STATES PATENTS

| | | |
|---|---|---|
| 1,798,923 | 3/1931 | Baker. |
| 2,225,975 | 12/1940 | Bruce _____ 236—68 X |
| 2,553,060 | 5/1951 | Miner. |
| 2,611,854 | 9/1952 | McNairy. |

FOREIGN PATENTS 873,956  8/1961  Great Britain.

EDWARD J. MICHAEL, Primary Examiner